(12) United States Patent
Garti et al.

(10) Patent No.: US 6,506,427 B1
(45) Date of Patent: Jan. 14, 2003

(54) METHOD FOR OBTAINING NATURAL SUPER-CLOUD COMPOSITIONS

(75) Inventors: Nisim Garti, Jerusalem (IL); Gilad Agmon, Ramat Hasharon (IL); Eli Pintus, Maale Adumim (IL)

(73) Assignee: Adumim Chemicals Ltd., Mishor Adumim (IL)

( * ) Notice: Subject to any disclaimer, the term of this patent is extended or adjusted under 35 U.S.C. 154(b) by 0 days.

(21) Appl. No.: 09/646,421

(22) PCT Filed: Mar. 15, 1999

(86) PCT No.: PCT/IL99/00143

§ 371 (c)(1),
(2), (4) Date: Nov. 16, 2000

(87) PCT Pub. No.: WO99/47008

PCT Pub. Date: Sep. 23, 1999

(30) Foreign Application Priority Data

Mar. 17, 1998 (IL) .................................................. 123702

(51) Int. Cl.⁷ ............................................. A23L 2/62
(52) U.S. Cl. ............................. 426/51; 426/50; 426/52; 426/599; 426/481
(58) Field of Search ............................. 426/50, 51, 52, 426/599, 616, 431, 481, 489; 435/275

(56) References Cited

FOREIGN PATENT DOCUMENTS

| | | | |
|---|---|---|---|
| FR | 2 253 465 A | 7/1975 | |
| GB | 1 072 733 A | 6/1967 | |

OTHER PUBLICATIONS

Garti N: "New natural *citrus*–based *cloudy* emulsions: progress and innovations." Leatherhead Food RA Food Industry Journal, vol. 1, Winter 1998.

Ilan Shomer and Uzi Merin: "Recovery of Citrus Cloud from Aqueous Peel Extract by Microfiltration" Journal of Food Science, vol. 49, No. 4, pp. 991–994, Apr. 1984.

*Primary Examiner*—Keith Hendricks
(74) *Attorney, Agent, or Firm*—Lowe Hauptman Gilman & Berner, LLP

(57) ABSTRACT

A method of obtaining a natural super-cloud composition of citrus components, which method entails: (a) extracting with water at a temperature of about 60–100° C. at least one citrus constituent comprising peel, core, cells, frit or juice or a combination thereof, to obtain water-extracted soluble citrus solids; (b) separating the water-extracted soluble citrus solids and discarding high mesh material, to obtain a liquor consisting essentially of low sedimented pulp; (c) enzymatically treating said liquor with pectolytic enzymes; (d) inactivating natural and added enzymes in the liquor; (e) centrifuging said liquor by hot centrifugation; (f) concentrating the centrifuged liquor; and (g) subjecting the concentrated liquor to membrane separation, wherein the membrane cut-offs are 30,000–500,000 molecular weight, and obtaining a retentate containing the super-cloud composition.

24 Claims, No Drawings

METHOD FOR OBTAINING NATURAL SUPER-CLOUD COMPOSITIONS

This application is a 371 of PCT/1L99/00143, filed Mar. 15, 1998.

FIELD OF THE INVENTION

The present invention relates to a method for selectively obtaining totally natural super cloud compositions of citrus components and for obtaining a cloudy dispersion of said citrus components, especially useful in the beverage industry. This method comprises a unique combination of enzymatic treatment of water soluble extract (WSECS-polysaccharides, mainly pectins, cellulose, hemicellulose and nonsolubles such as bioflavenoids, proteins, etc.) and separation techniques, specifically ultrafiltration using selective membranes. The method further comprises emulsion of said super cloud compositions with food grade oil, resulting in a preparation with no off flavor, bitterness or after taste, good stability and high opacity. The present invention also relates to super cloud compositions obtained by this method and to beverages containing them.

BACKGROUND OF THE INVENTION

For many years, citrus and beverage industries have been using cloudy emulsions to improve the appearance and stability of citrus based drinks consisting of less than 60 wt % orange juice. The concepts used in this field are based on providing an oil- in-water emulsion with weighting agents to the citrus drinks, so that the light scattering from the oil droplets will provide additional opacity to the final drink. In order to minimize creaming of the oil droplets, resulting in a ringing effect, a high density weight agent is added to the oil phase and droplets are reduced to a micronal range size. The thermodynamic instability of the emulsion is controlled, to some extent, with emulsifiers or stabilizers. Additives such as colorants, preservatives etc. could be added to the continuous water phase (water soluble additives) or to the oil phase (oil soluble additives).

The classical weighting agent, brominated vegetable oil (BVO), was banned in many countries due to its hazardous effects, and was replaced by ester gums (some synthetic and some extracted from plants). Also the monomeric emulsifiers used, such as Span and Tween have been replaced by various types of gum Acacia or gum Arabic, that when used in excess (up to 20 wt %), impart stability to the emulsion. All these cloudy emulsions require significant amounts of emulsifier to stabilize the emulsion against flocculation and coalescence.

According to the new trend, to replace synthetic components by totally natural components, attempts were made to utilize proteins and hydrocolloids and especially pectins and use them in cloudy emulsions. Pectins are concentrated in citrus peels. Some fractions of pectins have been known to stabilize certain dispersions of solid particles in the juice and to serve as an emulsifier to some of the essential oils present in the juice. Peel extracts and peel extract emulsions are presently used in cloudy emulsions but their performance is poor (a dilution of not more than 60, practically 30 to 50, could be made with absorbance of 1.0 OD with these samples). In addition, these emulsions are non-stable and impart bitterness, off flavor and some cloud instability to the final product.

U.S. Pat. No. 5,202,142 describes a process for the production of cloudy juices with stable cloudiness from natural products only by ultrafiltrating the raw juice and mixing in filter residues of cross flow filtration. Moreover, stabilizing agents must be mixed into the product of this US patent, to prevent the agglomeration of the cloudy particles.

The complex microstructure of polysaccharides—proteins—crystalline particles in the juice and other fruit components are not fully understood and it is almost impossible to extract them with out causing damage to the internal microstructure responsible for the cloudy effect.

In light of the present state of the art, the present invention surprisingly provides a method for specific and selective extraction of the active—cloudy—colloid composition from citrus peels and other parts of the fruit, comprising a unique combination of enzymatic treatment of water soluble extract citrus solids (WSECS) and separation techniques. The preparation obtained by this method is an all natural cloudy active preparation, having a selective internal and citrus derived composition of phenolic compounds, polysaccharides and other emulsifying components which, in emulsion, provide a preparation with excellent cloud, good stability and no after taste, off flavor, ringing effect or bitterness. The cloudy active compositions according to the present invention will therefore be referred to as "super cloud compositions".

SUMMARY OF THE INVENTION

The present invention relates to a method for obtaining natural super cloud compositions of citrus components, for use in beverages. (In the present invention the word compositions refers to citrus components either in emulsion or not). The method comprises:

a) applying water extraction on at least one of the following; peel, core, cells, frit, juice of citrus, obtaining water extracted soluble citrus solids;

b) separating said water extracted soluble citrus solids, discarding high mesh matter and obtaining a liquor consisting of low sedimented pulp;

c) applying enzymatic treatment on said liquor by pectolytic enzymes;

d) inactivating natural and added enzymes in the liquor;

e) centrifuging said liquor (hot centrifugation) obtaining a stable high cloud—low concentration of sedimented pulp;

f) further concentrating the liquor;

g) applying membrane separation technologies on said concentrated liquor, obtaining a retentant containing the required super cloud compositions;

The obtained super cloud compositions may be further emulsified with oil such as vegetable oils, Tall oils, marine oils, tropical oils, terpenless, essential citrus oils and essential vegetable or spices oils, and the oil concentration in the emulsion may be up to 15 wt %. The emulsion is homogenized to obtain particles of less than average 10 $\mu$m, preferably less than 1 $\mu$m. Water soluble or oil soluble coloring agents, or their combination, may be further added to the emulsion. Finally, the received cloudy emulsion may be added to a beverage achieving a cloudy effect.

The present invention relates to cloudy active compositions obtained by the said method and to beverages prepared according to this method.

Detailed Description of the Invention

The present invention relates to a method for selectively obtaining cloudy active compositions of citrus components (refered to in the present invention as "totally natural super cloud compositions" or "super cloud compositions") and for obtaining a cloudy dispersion of said citrus components. This method uses one or several of the processing streams of the juice and fruit industry, known also as water soluble extract citrus solids (WSECS), which consists of various compositions of core, cells, peel, frit and juice. A typical composition consists of 55–65% (solids) peel, 20–30 wt % core materials and 15–20% frit.

In the method of the present invention WESCS compositions are extracted with hot aqueous solutions, and/or deionized and/or condensated water or by heating a mixture of water and citrus compositions, for a period of 20–60 minutes, preferably 20–40 minute, at 30–100° C., or best at 55–60° C. Preferably, the water extraction is applied to any combination of citrus components which comprise up to about 70 wt % of the citrus fruit or to citrus components enriched with frits.

The extracted material is further decanted and/or separated (by press, finishers or decanters) removing the high mesh matter (20–40 mesh), and the lower sedimented pulp. The supernatant (known as liquor) in which the pulp level is controlled at up to 15 wt %, preferably at 1–5wt %, is subject to enzymatic treatment applied at 3–4 Brix, and, depending on the enzymes used, at levels of 5–100 ppm, preferably 5–20 ppm, at 30–55° C., for 20–60 minutes. The enzymatic process is controlled to adjust the viscosity, gelling properties, cloud stability and colloid stability to the required characteristics of the product. Pectolytic enzymes, such as Citrozyme cloudy 100 (NOVO) and pectinex 3XL (NOVO), are used to cleave the pectolytic matter and to obtain low molecular weight pectins, which are soluble and surface active. The enzymes are selected according to the feed characteristics of the fruit components, as per season, maturity, species, citrus hybrids and geographical location. Compositions of peel, core, cells, frit, juice of citrus fruits may vary from region to region and within species and, as a result, the conditions of the method of the present invention, may vary.

The enzymatic reaction is terminated by pasteuration at 95–105° C. for up to 90 seconds. Pasteuration results also in the inactivation of the natural enzymes and stops any enzymatic and microbial activity in the treated system. The pasteurized slurry (liquor) is treated by hot centrifugation (juice desludger, usually known in the art to be in the temperature range of 70–105° C.), for best control of the cloud instability factor or components, such as oxalic pectins (salts), coagulated particles etc. The product is at 3–5 Brix and is fruther pre-evaporated to 6–12 Brix, preferably 7–8 Brix.

The concentrated product is subjected to separation techniques consisting of microfiltration or, preferably, ultrafiltration. (Ultrafiltration relates to the use of membrane cutt—off of about 5000 to 500,000 molecular weight and microfiltration relates to membrane cut offs of molecular weights higher than 500,000 molecular weight). A membrane system batch type (one stage) may be used or a continuous system (multistage). Preferably, the ultrafiltration is by using a multistage configuration system, by utilizing a hollow fiber system of 60–106 mil at 40–60° C. wherein the membrane cut—offs are 5000–500,000 molecular weight at a flow rate of 40–3 liter/hour/ $m^2$ of the permeate. The product is further concentrated, preferably by evaporation (or by additional membranes), to 10–30 Brix. The ultrafiltration, carried out in a balanced way, utilizing specifically sized membranes, results in a concentrated retentant (known also as concentrate) containing the cloudy active compositions (refered to in the present invention as super cluod compositions). The clear permeate, is removed. This permeate consists of most of the low molecular weight oligomeric sugars, low MW pectinates, some proteins (mainly peptides) and undesirable polyphenols (destabilzing the emulsions). In this process some of the free and oligomeric sugars and the bitter components are removed and avoided from the final product. The retentant contains some residues such as hydrocolloids, proteins, sugars and other phenolic components such as simple phenols, polyphenols and bioflavonodes (esterified by glycosides and non—esterified compositions), but mainly insoluble polyphenols and bioflavanoids, in a solid crystalline form, such as naringine from grapefruits or hesperidine from oranges. In addition, the retentant contains the surface active pectins obtained in the enzymatic process. These compounds may further be emulsified with any food grade oil, such as vegetable oils, Tall oils, marine oils, tropical oils, terpenless, essential citrus oils and essential vegetable or spices oils etc. The oil concentration in this emulsion may vary from 1 to 15 wt %, preferably 3–10 wt %. The emulsion/dispersion may further be homogenized to obtain droplets/particles of less than average 10 $\mu$m, preferably less than 1 $\mu$m, which are added to any beverage to achieve a cloudy effect.

The obtained emulsion/dispersion is compatible with any water soluble and/or oil soluble coloring agents such as carmine, lycopene, $\beta$-carotene, Lutein, xantophils, etc.

This method provides a unique mixture of two different populations of light scattering particles, namely soluble oil droplets coated by surface active pectin polymers and insoluble polyphenols and bioflavonoids broken down to the required sized particles and protected by the active emulsifying agents. This is an improved composition of citrus components, with good emulsifying properties (on oil droplets) and good stabilization activity (on the solid crystalline matter). This combination provides accumulated light scattering, achieving an improved cloudy effect. The emulsion obtained by the method of the present invention does not include bitter components and is a superior system of liquid—liquid emulsion and solid—liquid dispersion for the production of cloudy beverages with stable cloudiness with no off flavor, bitterness or after taste.

The super cloud obtained in the method of the present invention may be of a concentration of 20–30 Brix, viscosity of 100–5000 cps, may contain water soluble pectins in a concentration of 5,000–20,000 mg/liter (10–11.2 Brix) and in a dilution of 1:25 may have a cloud index at 560 nm of 20–0% T. The present invention further relates to cloudy active compositions, especially soluble surface active low molecular weight pectins and proteins and insoluble polyphenols and bioflavonoids, obtained by the method of the invention and to beverages containing these compositions.

The said invention will be further illustrated by the following examples. These examples do not intend to limit the scope of the invention but to demonstrate and clarify it only.

EXAMPLE NO. 1

1. A mixture of 50 wt % peel, core, frit and juice residue taken from white grapefruit (Marsh seedless) was crushed by a hummer crusher while blending with water at 85° C. in a ratio of 1:1.5 (fruit components: water).
2. The high mesh (pumass) was separated by decantors yielding a juice of 3.6° Brix and 10% pulp content.
3. The juice was subject to treatment by pectolitic enzymes (Pectinex 3XL, Novo), 10 ppm (weight/weight) for 24 minutes.

4. Pasteurization at 98° C. for 60 seconds.
5. Centrifugation at a rate of 5000 Liter/hr for removal of fine sedimented pulp. This step resulted in product at 3.60 Brix with 0.5% sedimented pulp
6. Concentration to 7 Brix.
7. Feeding to a 2 stage continuous membranal system.
   Membrane type: H.F-PM-10/60 mil. Working temperature 50° C.
   Concentration Factor (CF)=9, ie: the membranal concentration ratio of permeate:retentent=9: 1. The resulting retentent Brix was 9.1
8. Concentration by vacuum with a batch cocentrator to 26.1 Brix and $SO_2$ preservation at 2500 ppm.
9. The obtained super-cloud was tested and confirmed as stable and high cloudy material. (See results in table 1.)

EXAMPLE NO. 2

Same as example no. 1 with the following changes:
1. The emzymatic treatment was carried out at 12 ppm.
2. The membranal concentration was CF=10. The resulting retentent Brix was 9.45
3. The vacuum concentration by the batch concentrator was to 28.2 Brix. (See results in table 1.)

EXAMPLE NO. 3

1. A mixture of peel, core, frit and juice residue which comprised 57% wt of the fruit, taken from Shamuti oranges was crushed by a hummer crusher while blending with water at 82° C./ in a ratio of 1:2 (fruit components: water).
2. The rough solid particles were separated by decantors yielding a juice of 3.9° Brix and 11% pulp content.
3. The juice was subject to treatment by pectolitic enzymes (Pectinex 3XL, Novo), 13 ppm (weight/weight) for 20 minutes.
4. Pasteurization at 102° C. for 60 seconds.
5. Centrifugation at a rate of 5000 Liter/hr (83 liter/hour/$m^2$)for removal of light suspensions.
   This step resulted in product at Brix3.9 with 0.8% sedimented pulp
6. Concentration to 8–9 Brix.
7. Feeding to membranal system- 2 stages in continuous process.
   Membrane type: H.F-PM-10/60 mil. Working temperature 50° C.
   Concentration Factor (CF)=9. The resulting retentent Brix was 12.0
8. Concentration by vacuum with batch cocentrator to 25.9 Brix and $SO_2$ preservation at 2500 ppm
9. The obtained super-cloud was tested and confirmed as stable and high cloudy material. (See results in table 2.)

EXAMPLE NO. 4

Same as example no.3 with the following changes:
1. The extract liquor was at 3.6 Brix and 8% pulp.
2.10 ppm enzymatic treatment.
3. CF of the membranal system was 10.2 The charged product was at 7.0 Brix
4. The retentent Brix was 9.5–10
5. Final concentration was 25.1 Brix. (See results in table 2.)

EXAMPLE NO. 5

Same as example 3 with the following changes:
1. The water: fruit ratio was 2.5:1.
2. The extract liquor was at 3.0 Brix and 6% pulp.
3.17 ppm enzymatic treatment.
4. CF of the membranal system was 10.0, The charged product was at 8–9 Brix 5. The retentent Brix was 11.8
6. Final concentration was 25.7 Brix.
7. The product was packed in sterile aseptic packages. (See results in table 2.)

EXAMPLE NO. 6

Same as the previous example with the following changes:
1. The water: fruit ratio was 2.25:1.
2. The extract liquor was at 3.5 Brix and 9–10% pulp.
3.17 ppm enzymatic treatment.
4. The retentent Brix was 12.0
5. Final concentration was to 28.8 Brix.
6. The product was packed in sterile aseptic packages. (See results in table 2.)

EXAMPLE NO. 7

Same as the previous example with the following changes:
1. The water: fruit ratio was 2:1.
2. The extract liquor was at 3.9 Brix and 10–12% pulp.
3. Final concentration was to 23.4 Brix. (See results in table 2.)

EXAMPLE NO. 8,9,10

In all these examples Valencia oranges were used as citrus source. The main processing parameters and results are listed in table 2.

Preparation of Cloudy Emulsions Based on the Super Cloud

EXAMPLE NO. 11

The super-cloud from example 1 was blended with 6% vegetable oil and with 15% water. The obtained emulsion was homogenized in a double stage piston homogenizer at 250 Atm. The final emulsion gave a high and stable cloud. The Optical Density (OD), measured at 580nm in a dilution of 1:25 in a 11.2 Brix syrup was 0.98. Repeated measurements of the same diluted product after 1 and 4 weeks gave OD values of 0.92 and 0.89 respectively, indicating a very stable cloud. No ring was observed after 4 weeks.

EXAMPLE NO. 12

The super-cloud from example 1 was blended with 10% orange oil and with 15% water. The obtained emulsion was homogenized in a double stage piston homogenizer at 280 Atm. The final emulsion gave a high and stable cloud. The Optical Density (OD), measured at 580 nm in a dilution of 1:25 in a 11.2 Brix syrup was 1.08. Repeated measuremnts of the same diluted product after 1 and 4 weeks gave OD values of 0.94 and 0.69 respectively, indicating a non stable cloud. A ring was observed after 3 weeks.

EXAMPLE NO. 13

The super-cloud from example 6 was blended with 6% vegetable oil and with 10% water. The obtained emulsion was homogenized in a double stage piston homogenizer at 250 Atm. The final emulsion gave a high and stable cloud. The obtained average droplet size was 1.3 $\mu$. The Optical Density (OD), measured at 580 nm in a dilution of 1:25 in 11.2 Brix syrup was 1.04 . Repeated measuremnts of the same diluted product after 1 and 4 weeks gave OD values of 0.99 and 0.94 respectively, indicating a very stable cloud. No ring was observed after 4 weeks.

TABLE 1

Supercloud concentrate from Grapefruit

| Exam No. | Process Conditions | Brix of Super-Cloud | Brookfield Viscosity | Bostvic | W. Soluble Pectins | Cloud Index (1:25,560 nm) | 24 hr Imhoff (conus) |
|---|---|---|---|---|---|---|---|
| 1 | 7 Brix, 10 ppm Enz. Treat. UF-C.F = 9 | 26.1 | 2120 cps | 17 cm | 15,200 mg/l | 13.7% T | 0.3% |
| 2 | 7 Brix, 12 ppm Enz. Treat. UF-C.F = 10 | 28.2 | 3640 cps | 14 cm | 13,900 mg/l | 20.9% T | 0.2% |

TABLE 2

Supercloud concentrate from Orange

| Exam No. | Process Conditions | Brix of Super-Cloud | Brookfield Viscosity | Bostvic | Cloud Index (1:25,560 nm) | 14 days column 100 ml | 24 hr Imhoff (conus) |
|---|---|---|---|---|---|---|---|
| 3 Shamuti | 8–9 Brix, 0.8% acid 13 ppm Enz. Treat. UF-C. F=9 | 25.9 | 1060 cps | 19 cm | 2.9% T | 87% | 0.14% |
| 4 Shamuti | 7 Brix, 1.0% acid 10 ppm Enz. Treat. UF-C.F = 10.2 | 25.1 | 2200 cps | 15 cm | 1.7% T | 93% | 0.1% |
| 5 Shamuti | 8.5 Brix, 0.7% acid 17 ppm Enz. Treat. UF-C.F = 10 | 25.7 | 1240 cps | 15 cm | 0.8% T | 95% | 0.2% |
| 6 Shamuti | 8.5 Brix, 0.8% acid 17 ppm Enz. Treat. UF-C.F = 10 | 28.8 | 1300 cps | 14 cm | 1.0% T | 90% | 0.12% |
| 7 Shamuti | 8.5 Brix, 0.7% acid 17 ppm Enz. Treat. UF-C.F = 10 | 23.4 | 1510 cps | 17 cm | 0.9% T | 95% | 0.1% |
| 8 Valencia | 8 Brix, 0.6% acid 20 ppm Enz. Treat. UF-C.F = 8 | 27.6 | 1850 cps | 17 cm | 1.0% T | 88% | 0.1% |
| 9 Valencia | 8 Brix, 0.6% acid 16 ppm Enz. Treat. UF-C.F = 8 | 27.8 | 2030 cps | 15 cm | 1.3% T | 87% | 0.1% |
| 10 Valencia | 8 Brix, 0.7% acid 12 ppm Enz. Treat. UF-C.F = 8 | 21.7 | 4000 cps | 13 cm | 1.5% T | 100% | 0.12% |

What is claimed is:

1. A method for obtaining a natural super cloud composition of citrus components comprising the steps of:

a) extracting with water at a temperature of about 60° C.–100° C. at least one citrus constituent comprising peel, core, cells, frit or juice or a combination thereof, for 20–60 minutes under continuous stirring, to obtain water-extracted soluble citrus solids;

b) separating said water-extracted soluble citrus solids, and discarding high mesh matter, to obtain a liquor consisting essentially of low sedimented pulp having a positive concentration of up to about 15wt % solids;

c) enzymatically treating said liquor with a cocktail of pectolytic enzymes at 30–55° C. for at least 20 minutes, wherein said cocktail of enzymes comprises one or more pectolytic enzymes capable of producing soluble and surface active pectins from said liquor;

d) inactivating natural and added enzymes in the liquor;

e) centrifuging said liquor by hot centrifugation in a juice desludger;

f) concentrating the centrifuged liquor to obtain a concentration of from 6 to 12 Brix; and g) subjecting said concentrated liquor to membrane separation by utilizing a hollow fiber system of about 60–106 mil at about 40–60 °C. at a permeate flow rate about 3–40 liter/hour/m², wherein the membrane cut-offs are 30,000–500,000 molecular weight, and obtaining a retentate containing the super cloud composition.

2. The method of claim 1, which further comprises after step g), the step of concentrating the retentate from 10 to 30 Brix.

3. The method of claim 1, which further comprises after step g), the step of emulsifying the obtained super cloud composition with oil and homogenizing the composition, thereby obtaining particles of less than an average of 10 μm.

4. The method of claim 1, which further comprises after step g), the step of adding the super-cloud composition to a beverage to produce cloudiness in said beverage.

5. The method of claim 1, wherein the step of water extraction a) is applied to said at least one citrus constituent which comprises up to about 70 wt % of the citrus fruit.

6. The method of claim 1, wherein the step of water extraction a) is applied to said at least one citrus constituent containing frit.

7. The method of claim 1, wherein inactivation of the enzymes in step d) is effected by pasteurizing at 90–105 °C. for up to 90 seconds.

8. The method of claim 1, wherein said membrane separation g) is effected with a batch membrane system or a continuous system.

9. The method of claim 3, wherein the oil for emulsifying the obtained retentate is food grade oil.

10. The method of claim 9, wherein the food grade oil is selected from the group consisting of vegetable oils, Tall oils, marine oils, tropical oils, terpenless essential citrus oils, essential vegetable and spice oils.

11. The method of claim 3, wherein the step of emulsifying the obtained super cloud composition with oil and homogenizing is effected with an oil concentration in the emulsion of from a positive amount to up to 15 wt %.

12. The method of claim 3, wherein water-soluble or oil-soluble coloring agents, or their combination are further added to the emulsion.

13. The method of claim 12, wherein the coloring agents are selected from carmine, lycopene, β-carotene, lutein and xantophils.

14. The method of claim 1, wherein the retentate of step g) comprises hydrocolloids, proteins, sugars, phenols, polyphenols or bioflavonoids or a mixture thereof.

15. The method of claim 14, wherein the retentate of step g) comprises polyphenols and bioflavonoids.

16. The method of claim 15, wherein the retentate of step g) comprises narirutin or hesperidin.

17. The method of claim 11, wherein the oil concentration is from 3 to 10 wt %.

18. The method of claim 1, wherein said one or more pectolytic enzymes comprises Citrozyme cloudy 100 or Pectinex 3XL or both.

19. The method of claim 1, wherein said step e) is effected such that the hot centrifugation is conducted at a temperature of 70–105° C., to produce a product of from 3 to 5 Brix.

20. The method of claim 1, wherein said at least one citrus constituent is obtained from oranges.

21. The method of claim 1, wherein said at least one citrus constituent is obtained from grapefruit.

22. A super cloud composition produced by the method of claim 1.

23. The super cloud composition of claim 22, which comprises a concentration of from 20–30 Brix, viscosity of from 100–500 cps, and water soluble pectins in a concentration of from 10,000–20,000 mg/liter and at a dilution of 1:25 has a cloud index at 560 nm of 0–20%T.

24. A beverage produced by the method of claim 4.

* * * * *